United States Patent [19]
Li et al.

[11] Patent Number: 5,591,318
[45] Date of Patent: Jan. 7, 1997

[54] METHOD OF FABRICATING A CONDUCTIVE POLYMER ENERGY STORAGE DEVICE

[75] Inventors: Changming Li, Vernon Hills; Ke K. Lian, Northbrook; Han Wu, Barrington, all of Ill.

[73] Assignee: Motorola Energy Systems, Inc., Northbrook, Ill.

[21] Appl. No.: 595,153

[22] Filed: Feb. 1, 1996

[51] Int. Cl.[6] .............................. C23C 22/78; C25D 5/34
[52] U.S. Cl. .............. 205/210; 205/91; 205/205; 205/317; 205/212; 205/213; 205/320; 205/321; 205/322; 427/115; 427/301; 427/327
[58] Field of Search .............................. 252/DIG. 2, 62.2; 427/115, 301, 327; 134/2; 205/91, 100, 205, 210, 213, 317, 212, 215, 216, 217, 320, 321, 323, 327, 322

[56] References Cited

U.S. PATENT DOCUMENTS 3,711,313  1/1973  Nagano et al. .......................... 205/213
4,954,226  9/1990  Mahmoud ............................... 205/210

FOREIGN PATENT DOCUMENTS 03064013  3/1991  Japan .

OTHER PUBLICATIONS

Abstract of JP 03064013 (Shimada et al.) Mar. 19, 1991.
Electrochemical Synthesis of Polyaniline on Tantalum and Stainless steel Electrodes,, Kogan, et al Synthetic Metals, 63 (1994) pp. 153–156.
Initiating Agents for Electrochemical Polymerization of Aniline on Titanium Electrodes, Abalyaeva, et al, Synthetic Metals, 63 (1994) pp. 109–113.

*Primary Examiner*—Kathryn Gorgos
*Assistant Examiner*—Alex Noguerola
*Attorney, Agent, or Firm*—Kenneth M. Massaroni

[57] ABSTRACT

A method for making high power electrochemical charge storage devices, provides for depositing an electrically conducting polymer (16), (18), onto a non-noble metal substrate (10), which has been prepared by treatment with a surfactant. Using this method, high power, high energy electrochemical charge storage devices may be fabricated with highly reproducible low cost.

7 Claims, 6 Drawing Sheets

METHOD OF FABRICATING A CONDUCTIVE POLYMER ENERGY STORAGE DEVICE

TECHNICAL FIELD

This invention relates in general to electrochemical charge storage devices, and particularly to high energy density, high power density polymer electrodes for such devices.

BACKGROUND

As electronic devices increasingly become portable, advances must be made in energy storage devices to enable such portability. Indeed it is often the case with current electronics technology that the limiting factor to portability of a given device is the size and the weight of the associated energy storage device. Obviously, a small energy storage device may be fabricated for a given electrical device application, but at the cost of energy capacity. Conversely, a large energy storage device yielding long life may be attached to a device, but typically at the expense of size and portability. The result is that either the energy storage device is too bulky, too heavy, or does not last long enough for a given application. Typical energy storage devices used for portable electronics include the electrochemical battery cell, and, increasingly, the electrochemical capacitor.

Electrochemical capacitors are a class of devices characterized by relatively high power densities as compared with conventional battery systems. The charge mechanism of such capacitors is typically the result of primary, secondary, tertiary, and higher order oxidation/reduction reactions between the electrodes and the electrolyte of the capacitor.

Heretofore, such devices have typically been made with electrodes fabricated of relatively exotic, expensive materials such as ruthenium. More recently, conductive polymers such as polyaniline have been explored for use as the electrode in such devices. Conductive polymers have the advantage of being relatively inexpensive as well as easy to fabricate. However, such devices have heretofore been successfully fabricated most easily only on noble metal substrates, such as platinum or gold. Electrochemical deposition of some polymers onto non-noble metals and alloys have been accomplished through the use of initiators such as $CuCl_2$, $MoCl_5$, $IrCl_6$, and $PtCl_6$. Each of these methods have substantial drawbacks. First, the high cost of noble metals makes the fabrication of such devices economically unattractive. Secondly, researchers have found that the initiators explored heretofore have resulted in deposition processes which are very difficult to control, and which yield poor coating quality, i.e., poor adhesion and high resistance. See Kogan, et al, Electrochemical Synthesis of Polyaniline on Tantalum and Stainless Steel Electrodes, *Synthetic Metals*, 63 (1994) 153–156, at FIG. 3, which illustrates poor capacitor performance. Further, the initiators are either highly toxic or as expensive as the noble metal substrates.

Accordingly, there is a need for an electrochemical capacitor device which is fabricated of a conductive polymer deposited on an inexpensive substrate, and which demonstrates acceptable device performance. There is a concomitant need for a method for fabricating such devices in an inexpensive, repeatable, manner. To accomplish this, there is a need for new processing techniques which allow for the electrochemical deposition of electrically conductive polymers in an economical manner while overcoming the problems associated with the prior art, namely poor adhesion and high resistance.

DETAILED DESCRIPTION OF THE PREFERRED EMBODIMENT

Figure 1:
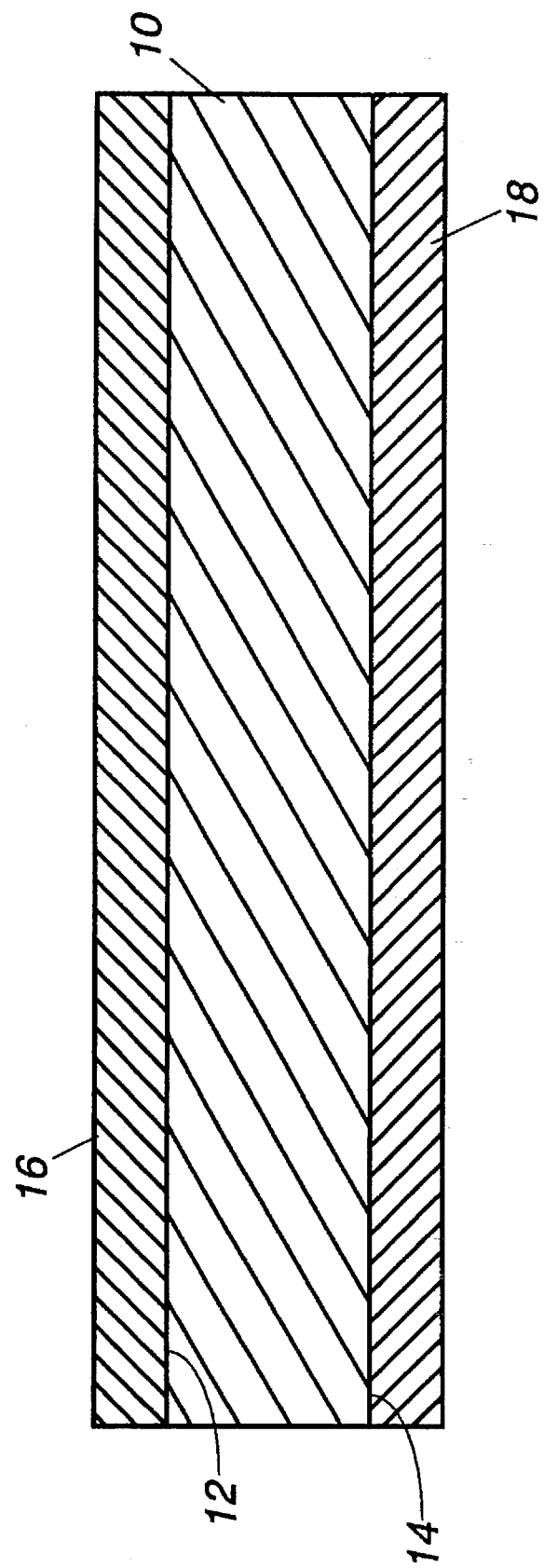
FIG. 1 is a cross-sectional sideview of an electrochemical device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein cross-sectional side view of an electrochemical capacitor device in accordance with the instant invention. The capacitor device comprises a current collecting substrate 10 having at least first and second major surfaces 12 and 14 and may be, for example, a foil, a mesh, or a metallized cloth. Deposited on at least one of surfaces 12 and 14 is a layer of conducting polymer, such as layer 16 and 18.

The substrate is preferably formed of a non-noble metal and hence may be fabricated from any of a number of materials, including, but not limited to, zinc, titanium, stainless steel, nickel, iron, lead, tin, indium, chromium, tungsten, aluminum, molybdenum, bismuth, niobium, magnesium, alloys of the same, and combinations thereof. More preferred materials for said substrate include stainless steel, titanium, an alloy of nickel-molybdenum-chromium, amorphous nickel/chrome or amorphous nickel/chrome alloys.

The substrate thickness is typically between 10 μm and 1,000 μm and preferably about 25–75 μm thick. When a higher surface area substrate is required, a mesh fabricated of the materials described above may be used.

In order to accommodate the deposition of a conductive polymer, at least one of said major surfaces, and preferably both of said surfaces, are exposed to a treatment process which decreases the surface energy of the substrate, thus promoting the absorption and polymerization of conductive polymers onto the substrate surface. The surface treatment process comprises the step of treating said surface with a surfactant. The treatment itself may be either washing the surfaces, or soaking the substrate foils in the surfactant.

The surfactant may be selected from the group of materials characterized by long chain molecules with one or more hydrophobic and one or more hydrophillic functional groups, preferably at opposite sides of the chain, and is preferably soluble and stable in the desired plating bath, regardless of whether the plating bath is aqueous or not. The surfactant is selected from the group of materials consisting of sodium dodecyl sulfate, polyethylene glycol, polyethylene tridecyl ether, polyethylene ester, perfluoroalkyl iodides, perfluoroalkyl alchols, perfluoroalkyl methacrylates, perfluoroalkyl esters, fluoroalkyl carbonyxlates, fluoroalkyl phosphates, fluoroalkyl polyethers, polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitan tristearate, and combinations thereof. The surfactant is preferably prepared as an aqueous solution in which the surfactant comprises between 0.01 and 5.0% of the aqueous solution and the balance of the aqueous solution being comprised of an organic solvent such as water, hexanol, butinol, propanol, 2-butanol, 2-hexanol, 2-propanol, pentanol, and combinations thereof. Preferred surfactants for use in treating said substrate are polyoxyethylene sorbitan monostearate, (known as TWEEN 60® from ICI Company, Ltd.), polyoxyethylene tridecyl ether (known as RENEX 30® from ICI Company, Ltd.), perfluoro alkyl iodide (known as Zonyl® from Dupont), and sodium dodecyl sulfate.

Thereafter, the conductive polymer may be deposited upon the treated surface of the substrate 10. Preferred conductive polymers include, but are not limited to, p or n doped conducting polymers, such as polyaniline, polypyrrole, polyanisidene, polyparaphenylene, polythiophene, polyacetylene, polyfuran, polyazulene, polyindole, and combinations thereof. While the preferred method for treating the surface of the substrate is to wash or soak it in the surfactant, it is also possible to dissolve the conductive polymer monomer into the surfactant solution, and deposit from said solution. The invention may be better understood from a consideration of the examples which follow:

EXAMPLES

In all of the following examples, a conductive polymer film was grown on a surfactant treated surface by potential cycling. All materials used were reagent grade. The thickness of the deposited film increased with increasing number of cycles. In all cases, an EG & G potentiostat was used for electrochemical testing. Counter and reference electrodes were titanium and Ag/AgCl electrodes respectively. The range of cycling voltage was from –0.35 to 1.05 volts with reference to the Ag/AgCl electrode. All tests were carried out at room temperature (18° C.).

Example 1

Figure 2:
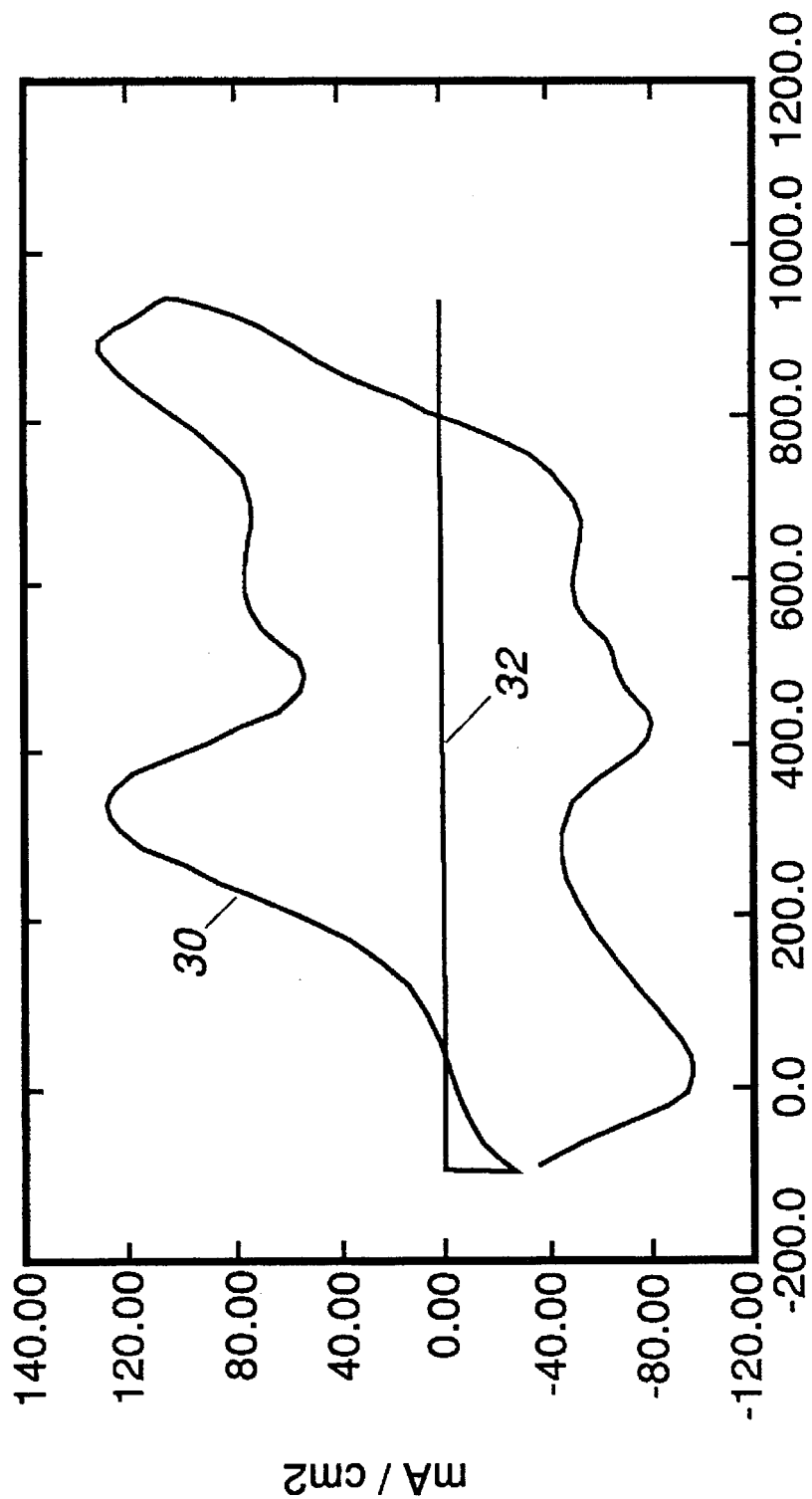
FIG. 2 is a cyclic voltammogram ("CV") of an electrochemical device in accordance with the invention.

Referring now to FIG. 2, there is illustrated therein the cyclic voltammogram ("CCV") curves for polyaniline deposited from 0.2 M aniline/1M $H_2SO_4$, with and without a 1% perfluoroalkyl iodide (Dupont Zonyl®) in water surfactant treatment, respectively The substrate used in connection with this Example 1 was a polycrystalline nickel/molybdenum/chromium based alloy of the formula $Ni_{58.5}$ $Cr_{21}$ $Mo_{13.5}$ $W_3$ $Fe_4$. The substrate was immersed in the surfactant solution for about one minute. In FIG. 2, Line 30 illustrates the cyclic voltammogram of the device fabricated using the surfactant while line 32 illustrates that without the use of the surfactant. As maybe readily appreciated from FIG. 2, polyaniline could not be deposited on the nickel/molybdenum/chromium based alloy substrate without the surfactant, while with the surfactant, polyaniline was grown readily, indicating that the surfactant could initiate the polyaniline deposition process. The polyaniline deposition on the surface was highly uniform and the charge storage capacity was approximately 760 millicoulombs per $cm^2$.

Example 2

Figure 3:
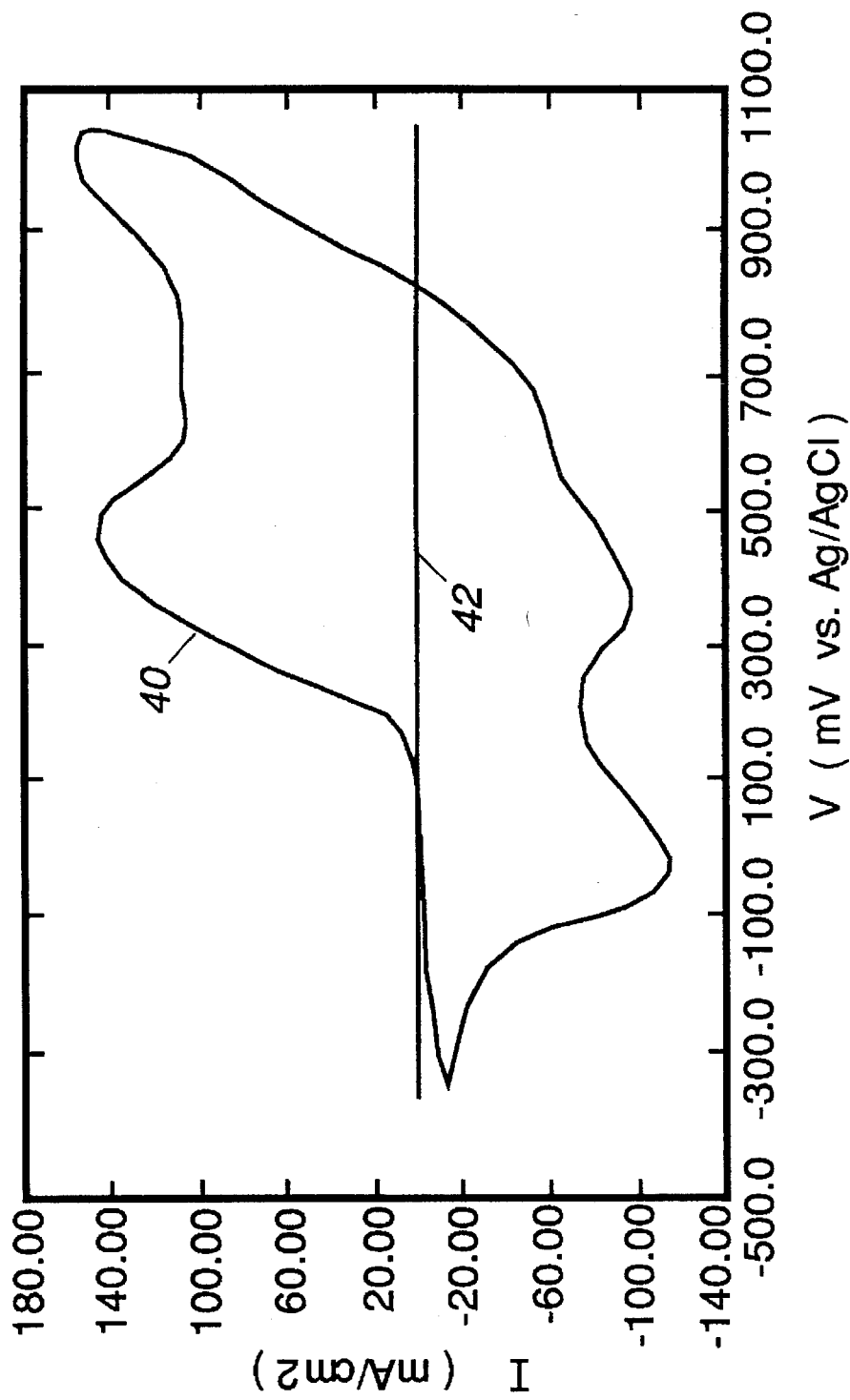
FIG. 3 is a cyclic voltammogram for a second electrochemical device in accordance with the invention.

Referring now to FIG. 3, there is illustrated therein the cyclic voltammogram curves for polyaniline deposited from 0.2 M aniline/1M $H_2SO_4$, with and without the surfactant treatment used in Example 1. The substrate used in connection with this Example 2 was an amorphous nickel/chromium based alloy of the formula $Ni_{80.8}$ $Cr_{15.2}$ $B_{4.0}$. The substrate was immersed in the surfactant for about one minute. In FIG. 3, Line 40 illustrates the cyclic voltammogram of the device fabricated using the surfactant while line 42 illustrates that without using the surfactant. As maybe readily appreciated from FIG. 3, polyaniline could not be deposited on the substrate without the surfactant, while with the surfactant polyaniline was grown readily, indicating that the surfactant could initiate the polyaniline deposition process. The polyaniline deposition on the surface was highly uniform and the charge storage capacity was approximately 850 millicoulombs per $cm^2$.

Example 3

Figure 4:
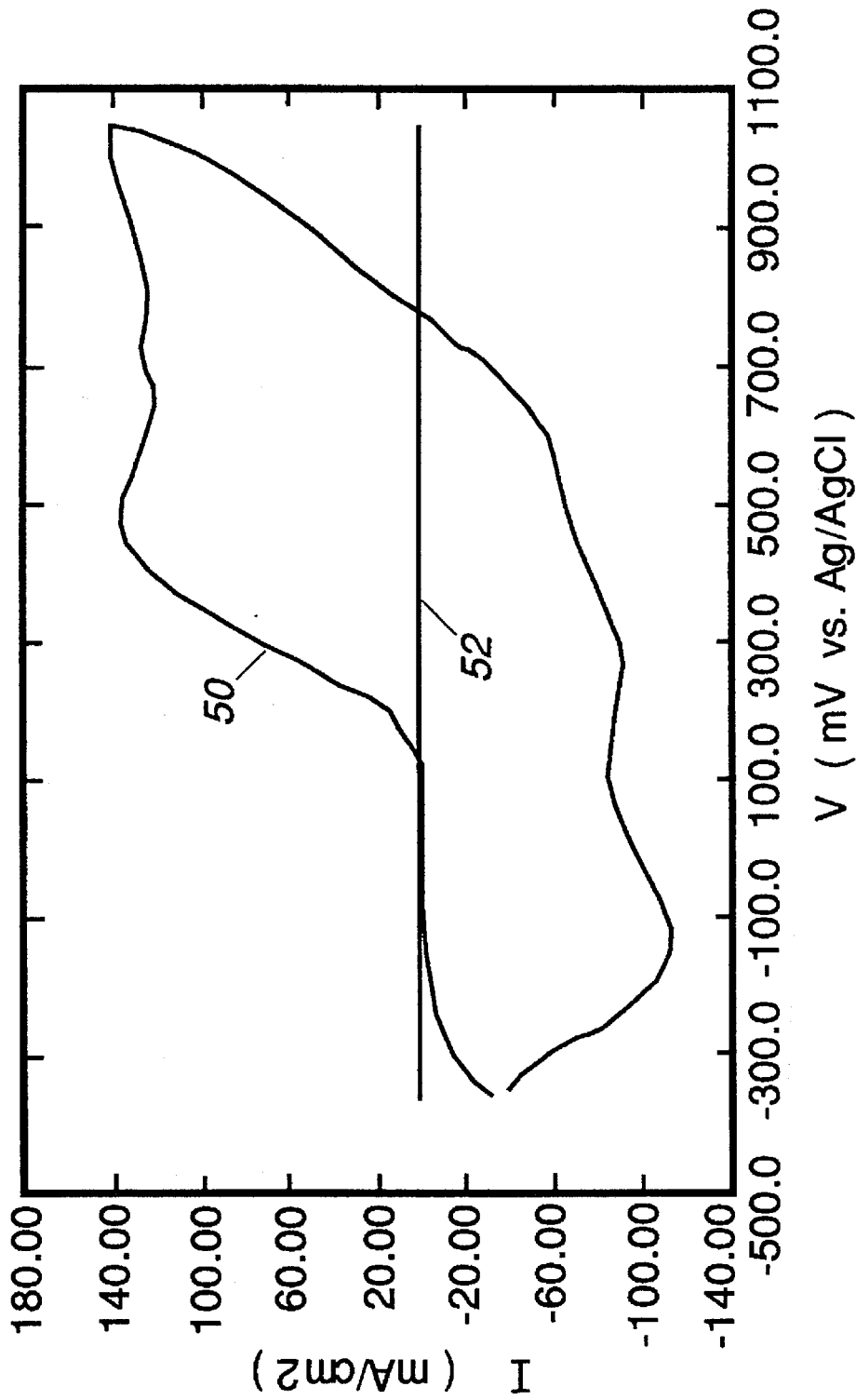
FIG. 4 is a CV for a third electrochemical device in accordance with the instant invention.

Referring now to FIG. 4, there is illustrated therein the cyclic voltammogram curve for polyaniline deposited from 0.2M aniline/1M $H_2SO_4$ with and without the surfactant treatment used in Example 1. The substrate used in connection with this Example 3 was a titanium foil which was immersed in the surfactant for about one minute. In FIG. 4, line 50 illustrates the cyclic voltammogram of the device fabricated using the surfactant while line 52 illustrates that without using the surfactant. As maybe readily appreciated from FIG. 4, polyaniline could not be deposited on the titanium foil without the surfactant, while with the surfactant polyaniline was grown readily, indicating that the surfactant could initiate the polyaniline deposition process. The polyaniline deposition on the surface was highly uniform and the charge storage capacity was approximately 850 millicoulombs per $cm^2$.

Example 4

Figure 5:
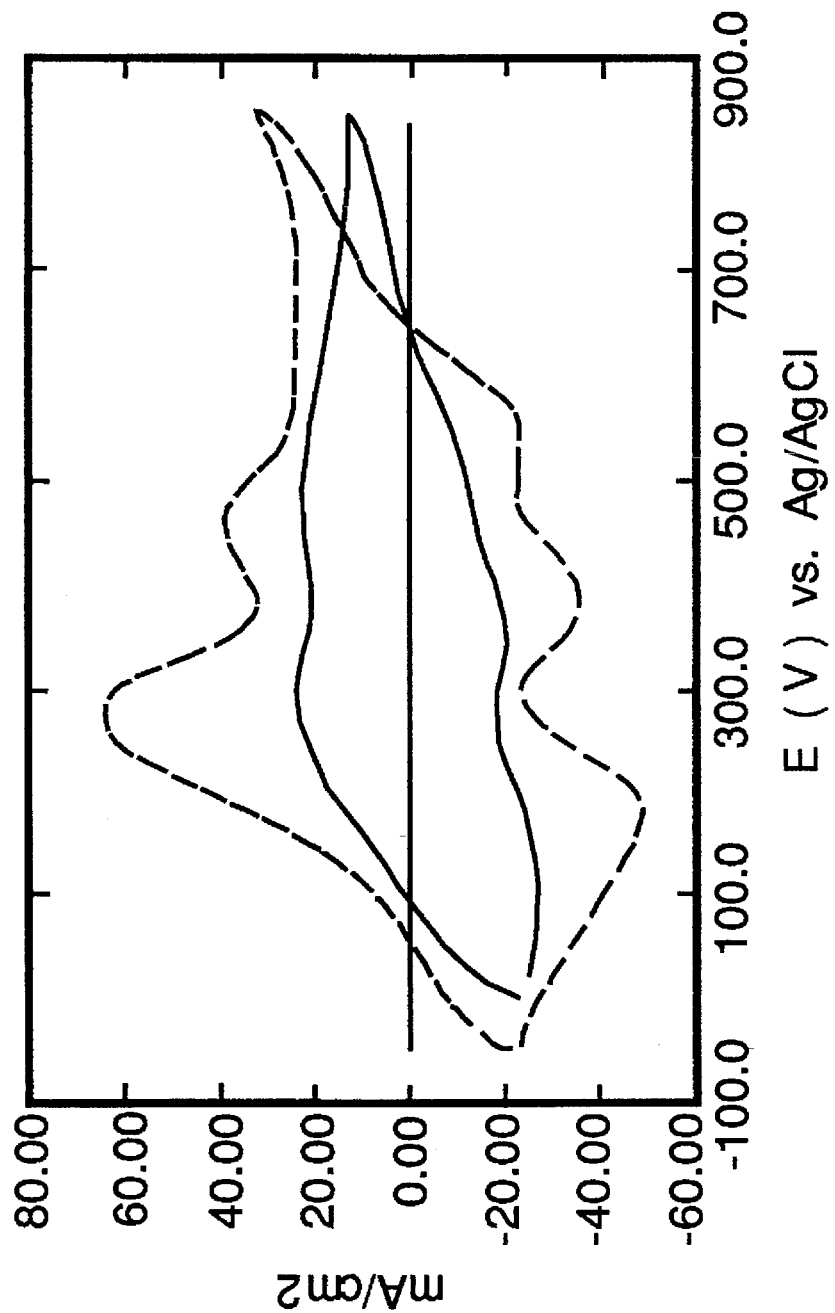
FIG. 5 is a CV for a fourth electrochemical device in accordance with the instant invention.

Referring now to FIG. 5, there is illustrated therein a cyclic voltammogram for the deposition of poly-anisidine deposited upon the polycrystalline nickel/molybdenum/chrome alloy substrate deposited in Example 1 hereinabove. The anisidine is a derivative of aniline which may be electrochemically polymerized to form a conductive polymer as a derivative of polyaniline. The poly-anisidine was deposited two ways: (1) from a solution of 0.14M O-anisidine, 1.0M $H_2SO_4$+1% ZONYL® perfluoroalkyl iodide (Dupont Zonyl®) in water surfactant treatment; and (2) 0.14M o-anisidine, 1.0M $H_2SO_4$+0.5% sodium dodecyl sulfate in water. Lines 60, 62, 64 refer respectively, to the deposition of poly-anisidine with ZONYL®, sodium dodecyl sulfate, and no treatment. Without treatment, no deposition was observed. It may be appreciated from a perusal of FIG. 5, that polyanisidine polymerized with the treatment of dodecyl sulfate more favorably than that with the treatment of ZONYL, indicating that the former had higher electrochemical reversibility. The charge storage capacity of the device fabricated with the dodecyl sulfate was approximately 724 millicoulombs/$cm^2$ while that of Zonyl is about 500 millicoulombs/$cm^2$.

Example 5

Figure 6:
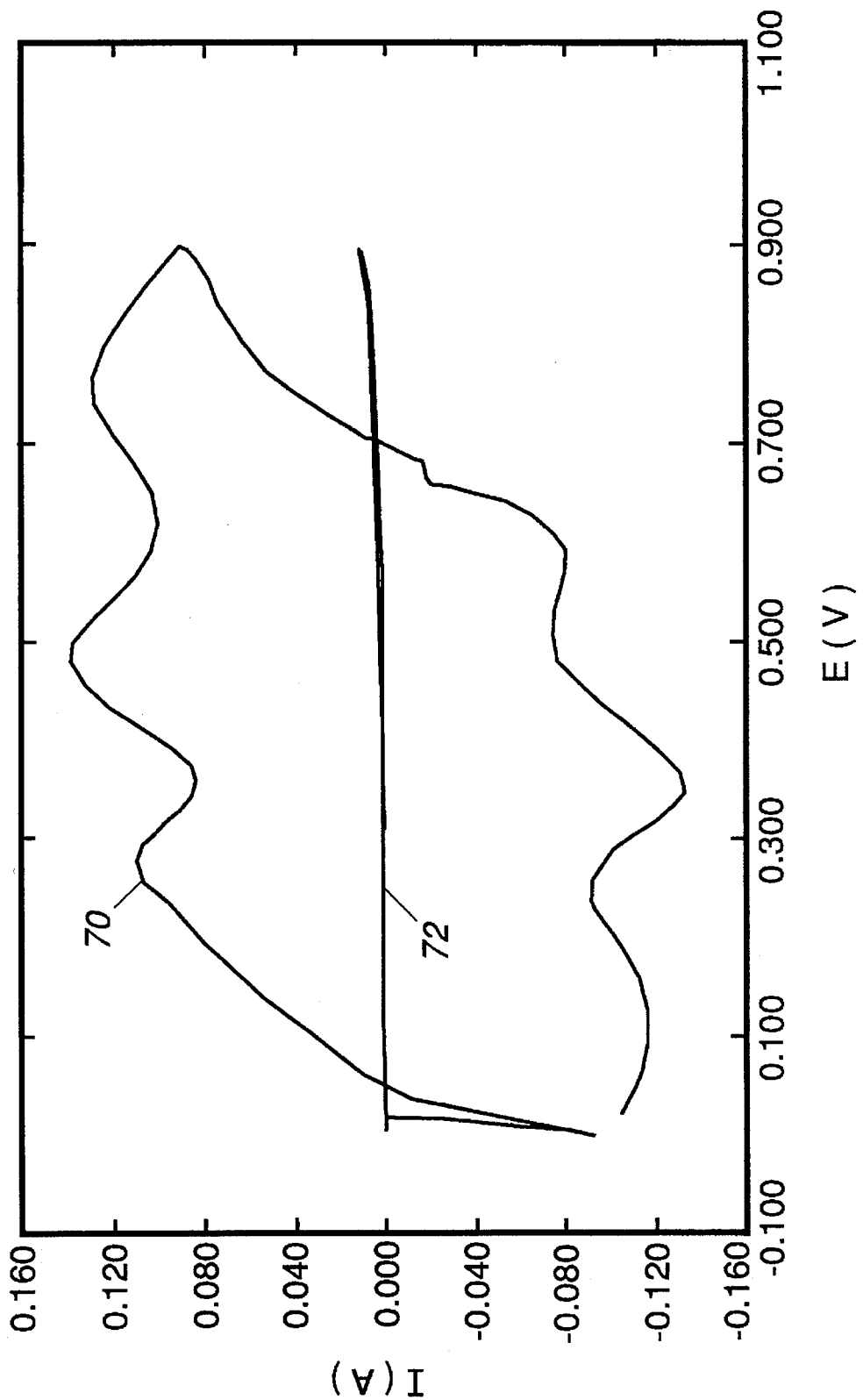
FIG. 6 is a CV for a fifth electrochemical device in accordance with the instant invention.

Referring now to FIG. 6, there is illustrated therein the cyclic voltammogram of a layer of polyanisidine deposited on a Ni/Cu based alloy substrate, with and without surfactant treatment. The surfactant was as in Example 1, while the substrate was $Ni_{67.5}Cu_{30}Fe_{1.5}Mn_1$. The substrate was immersed in the surfactant for about one minute. Line 70 illustrates the CV of the device using the surfactant, no polymer was deposited on the untreated substrate, while the treated substrate had a highly uniform layer of poly-anisidine deposited thereon.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of electrochemically depositing a conductive polymer electrode onto a non-noble metal current collecting substrate, said method comprising the steps of coating said substrate with a surfactant selected from the group consisting of perfluoroalkyl iodides, perfluoroalkyl alcohols, perfluoroalkyl methacrylates, perfluoroalkyl esters, perfluoroalkyl carbonyxlates, perfluoroalkyl phosphates, perfluoroalkyl polyethers and combinations thereof; and then electrochemically depositing said conductive polymer.

2. A method as in claim 1, wherein said surfactant is perfluoro alkyl iodide.

3. A method as in claim 1, wherein the step of coating said substrate comprises immersing said substrate in said surfactant.

4. A method as in claim 1, wherein said conductive polymers are selected from group consisting of polyaniline, polypyrrole, polyanisidene, polyparaphenylene, polythiophene polyacetylene, polyfuran, polyazulene, polyindole, and combinations thereof.

5. A method as in claim 1, wherein said non-noble metal substrate is selected from the group consisting of zinc, titanium, stainless steel, nickel, iron, lead, tin, indium, chromium, tungsten, aluminum, molybdenum, bismuth, niobium, magnesium, alloys of the same, and combinations thereof.

6. A method as in claim 1, wherein said non-noble metal substrates is amorphous.

7. A method as in claim 1, wherein said non-noble metal substrate is polycrystalline.

* * * * *